US011321913B2

(12) United States Patent
Han et al.

(10) Patent No.: US 11,321,913 B2
(45) Date of Patent: May 3, 2022

(54) THREE-DIMENSIONAL (3D) MODELING METHOD OF CLOTHING

(71) Applicant: Z-EMOTION CO., LTD., Busan (KR)

(72) Inventors: Dong Soo Han, Busan (KR); Dong Wook Yi, Busan (KR)

(73) Assignee: Z-EMOTION CO., LTD., Busan (KR)

( * ) Notice: Subject to any disclaimer, the term of this patent is extended or adjusted under 35 U.S.C. 154(b) by 0 days.

(21) Appl. No.: 17/050,069

(22) PCT Filed: Nov. 28, 2019

(86) PCT No.: PCT/KR2019/016645
§ 371 (c)(1),
(2) Date: Oct. 23, 2020

(87) PCT Pub. No.: WO2021/107204
PCT Pub. Date: Jun. 3, 2021

(65) Prior Publication Data
US 2021/0166472 A1    Jun. 3, 2021

(30) Foreign Application Priority Data
Nov. 28, 2019  (KR) .......................... 10-2019-0155833

(51) Int. Cl.
*G06T 19/20*   (2011.01)
*G06T 17/00*   (2006.01)
*G06T 7/73*    (2017.01)

(52) U.S. Cl.
CPC ............... *G06T 17/00* (2013.01); *G06T 7/75* (2017.01); *G06T 19/20* (2013.01); *G06T 2219/2004* (2013.01)

(58) Field of Classification Search
CPC ... A41H 3/00; A41H 3/04; A41H 5/02; A41H 31/00; G06F 2217/32; G06T 7/62;
(Continued)

(56) References Cited

U.S. PATENT DOCUMENTS

2007/0250203 A1    10/2007  Yamamoto et al.
2010/0305909 A1*   12/2010  Wolper ................... G06T 17/00
                                                          703/1
(Continued)

FOREIGN PATENT DOCUMENTS

JP      5161229 B2      3/2013
KR      101192208 B1    10/2012
(Continued)

OTHER PUBLICATIONS

Groß, Clemens, Arnulph Fuhrmann, and Volker Luckas. "Automatic pre-positioning of virtual clothing." Proceedings of the 19th spring conference on Computer graphics (Year: 2003).*
(Continued)

*Primary Examiner* — Diane M Wills
(74) *Attorney, Agent, or Firm* — Buchanan Ingersoll & Rooney PC (57) ABSTRACT

A three-dimensional (3D) modeling method of clothing to arrange and display parts constituting clothing on a 3D space includes loading pattern data and body data, wherein the pattern data comprises information about one or more parts constituting the clothing, and the body data comprises a 3D shape of a body on which the clothing is to be put; displaying the 3D shape of the body based on the body data; and displaying the one or more parts on the 3D shape of the body based on the pattern data.

1 Claim, 10 Drawing Sheets

(58) Field of Classification Search
CPC .......... G06T 7/75; G06T 17/00; G06T 17/10; G06T 2210/21; G06T 2210/16; G06T 2219/2004; G06T 2219/2016
See application file for complete search history.

(56) References Cited

U.S. PATENT DOCUMENTS

| | | | |
|---|---|---|---|
| 2018/0012420 A1* | 1/2018 | Ngo Ngoc | .............. G06T 19/20 |
| 2018/0020756 A1 | 1/2018 | Nouais et al. | |
| 2020/0027155 A1* | 1/2020 | Frakes | ................... G06Q 30/06 |
| 2021/0056743 A1* | 2/2021 | Lee | ................... G06K 9/00362 |
| 2021/0056754 A1* | 2/2021 | Ju | ........................... G06T 19/20 |

FOREIGN PATENT DOCUMENTS

| | | |
|---|---|---|
| KR | 101726397 B1 | 4/2017 |
| KR | 20190023486 A | 3/2019 |

OTHER PUBLICATIONS

Volino, Pascal, Martin Courchesne, and Nadia Magnenat Thalmann. "Versatile and efficient techniques for simulating cloth and other deformable objects." Proceedings of the 22nd annual conference on Computer graphics and interactive techniques (Year: 1995).*

International Search Report (PCT/ISA/210) and Written Opinion (PCT/ISA/237) dated Aug. 20, 2020, by the Korean Patent Office as the International Searching Authority for International Application No. PCT/KR2019/016645.

Office Action dated Sep. 18, 2020, by the Korean Patent Office for Application No. 10-2019-0155833.

* cited by examiner

THREE-DIMENSIONAL (3D) MODELING METHOD OF CLOTHING

TECHNICAL FIELD

The present disclosure relates to a three-dimensional (3D) modeling method of clothing to arrange and display parts constituting clothing on a 3D space.

BACKGROUND ART

As the standard of living gradually increases, selection of clothing is an important part as a way to express one's individuality in addition to solving basic food, clothing and shelter. People wear or own clothing that suits them or in their preferred colors and designs such that they enhance their external image as well as their self-satisfaction.

Clothing-related business that designs, manufactures, and sells clothing is expanding widely through Internet shopping malls which are active with the recent development of the Internet, in addition to the existing offline. In particular, as young people who are interested in clothing have become more prominent in their social advancement, such clothing-related business is a business field that is expected to develop continuously in the future.

Upon briefly reviewing clothing production process currently being conducted offline, first, designers create patterns by designing clothing they intend to release in the future. Then, designers sew these patterns to produce samples. When samples are produced, designers evaluate the design through an in-house meeting (exhibition), and request the production of samples of designs that are consumers' reaction, that is, expected to be highly commercial from clothing makers.

According to the related art, design work for clothing to be produced in the future, pattern production according to the design, and sewing work of connecting the produced patterns to each other are all performed manually. When design work, pattern production, and sewing work are performed manually, the manufacturing cost of the product increases because a large number of manpower must spend a lot of time working.

In addition, in the case of partially modify a high quality clothing design, because the above-described process must be repeated countless times by modifying the pattern, there is a problem that the working time for product development increases. Although methods of producing patterns on a computer by computerizing this process are partially used, to accurately evaluate the finished clothing, there is still the inconvenience of manually completing the prototype.

DESCRIPTION OF EMBODIMENTS

Technical Problem

Provided is to visually examine whether clothing being produced may match the body of various sizes in the production stage of clothing.

Provided is also to more naturally model a situation when clothing is put on the human body.

In addition, provided is a clothing sewing prediction in a more accurate form.

In addition, provided is to prevent a failure of modeling of clothing or a failure of proper 3D modeling of clothing due to overlapping of a 3D shape of a part with a 3D shape of a body during a 3D modeling process of clothing.

In addition, provided is to previously examine a problem that may occur during an assembling process of clothing through modeling of clothing.

Technical Solution to Problem

According to an aspect of the present disclosure, a three-dimensional (3D) modeling method of clothing to arrange and display parts constituting clothing on a 3D space includes loading pattern data and body data, wherein the pattern data comprises information about one or more parts constituting the clothing, and the body data comprises a 3D shape of a body on which the clothing is to be put; displaying the 3D shape of the body based on the body data; and displaying the one or more parts on the 3D shape of the body based on the pattern data.

The displaying of the one or more parts may include displaying a 3D shape of the one or more parts on a position corresponding to each of the one or more parts on the 3D shape of the body; and displaying a combining relationship between the one or more parts displayed on the 3D shape of the body based on the pattern data.

The one or more parts may include a first part and a second part, and the displaying of the 3D shape of the one or more parts may include determining a first position of the first part such that a distance between any one portion on a 3D shape of the first part and the 3D shape of the body is equal to or greater than a predetermined first critical distance; correcting the first position such that a distance between any one portion on the 3D shape of the first part and any one portion on a 3D shape of the second part is equal to or greater than a predetermined second threshold distance; and displaying the 3D shape of the first part on the corrected first position.

The one or more parts may include a first part and a second part combined with the first part, and the displaying of the combining relationship between the one or more parts may include displaying a first portion of the first part and a second portion of the second part that is combined with the first portion in correspondence with each other.

The displaying of the first portion of the first part and the second portion of the second part that is combined with the first portion in correspondence with each other may include displaying a 3D shape of a thread according to sewing connecting the first portion and the second portion on a 3D space.

The displaying of the 3D shape of the thread may include determining the 3D shape of the thread by referring to at least one of the 3D shape of the body and the 3D shapes of the one or more parts such that the 3D shape of the thread does not overlap with the 3D shape of the body and the 3D shapes of the one or more parts.

The displaying of the first portion of the first part and the second portion of the second part that is combined with the first portion in correspondence with each other may further include obtaining a user input to move the first part to a second position on a 3D space; displaying the first part on the second position according to the user input; and updating and displaying the 3D shape of the thread such that a first portion of the first part moved to the second position and the second part are connected to each other.

The 3D modeling method may further include, after the displaying of the one or more parts, displaying a process of combining the one or more parts on the 3D shape of the body and putting clothing on the 3D shape of the body.

Advantageous Effects of Disclosure

According to the present disclosure, it is possible to visually examine whether clothing being produced may match the body of various sizes in the production stage of clothing.

In addition, the present disclosure may more naturally model a situation when clothing is put on the human body.

In addition, the present disclosure may provide a clothing sewing prediction in a more accurate form.

In addition, the present disclosure may prevent a failure of modeling of clothing or a failure of proper 3D modeling of clothing due to overlapping of a 3D shape of a part with a 3D shape of a body during a 3D modeling process of clothing.

In addition, the present disclosure may previously examine a problem that may occur during an assembling process of clothing through modeling of clothing.

BEST MODE

According to an aspect of the present disclosure, a three-dimensional (3D) modeling method of clothing to arrange and display parts constituting clothing on a 3D space includes loading pattern data and body data, wherein the pattern data comprises information about one or more parts constituting the clothing, and the body data comprises a 3D shape of a body on which the clothing is to be put; displaying the 3D shape of the body based on the body data; and displaying the one or more parts on the 3D shape of the body based on the pattern data.

MODE OF DISCLOSURE

The detailed description of the present disclosure to be described later refers to the accompanying drawings, which illustrate a specific embodiment in which the present disclosure may be practiced. These embodiments are described in detail sufficient to enable those skilled in the art to practice the present disclosure. It is to be understood that various embodiments of the present disclosure are different from each other but need not be mutually exclusive. For example, specific shapes, structures, and characteristics described herein may change from one embodiment to another and implemented without departing from the spirit and scope of the present disclosure. In addition, it should be understood that the positions or arrangements of individual elements in each embodiment may change without departing from the spirit and scope of the present disclosure. Therefore, the detailed description to be described below is not made in a limiting sense, and the scope of the present disclosure should be taken as encompassing the claimed scope of the claims and all scopes equivalent thereto. Like reference numerals in the drawings denote the same or similar elements over several aspects.

Hereinafter, various embodiments of the present disclosure will be described in detail with reference to the accompanying drawings in order to enable those skilled in the art to easily implement the present disclosure.

Figure 1:
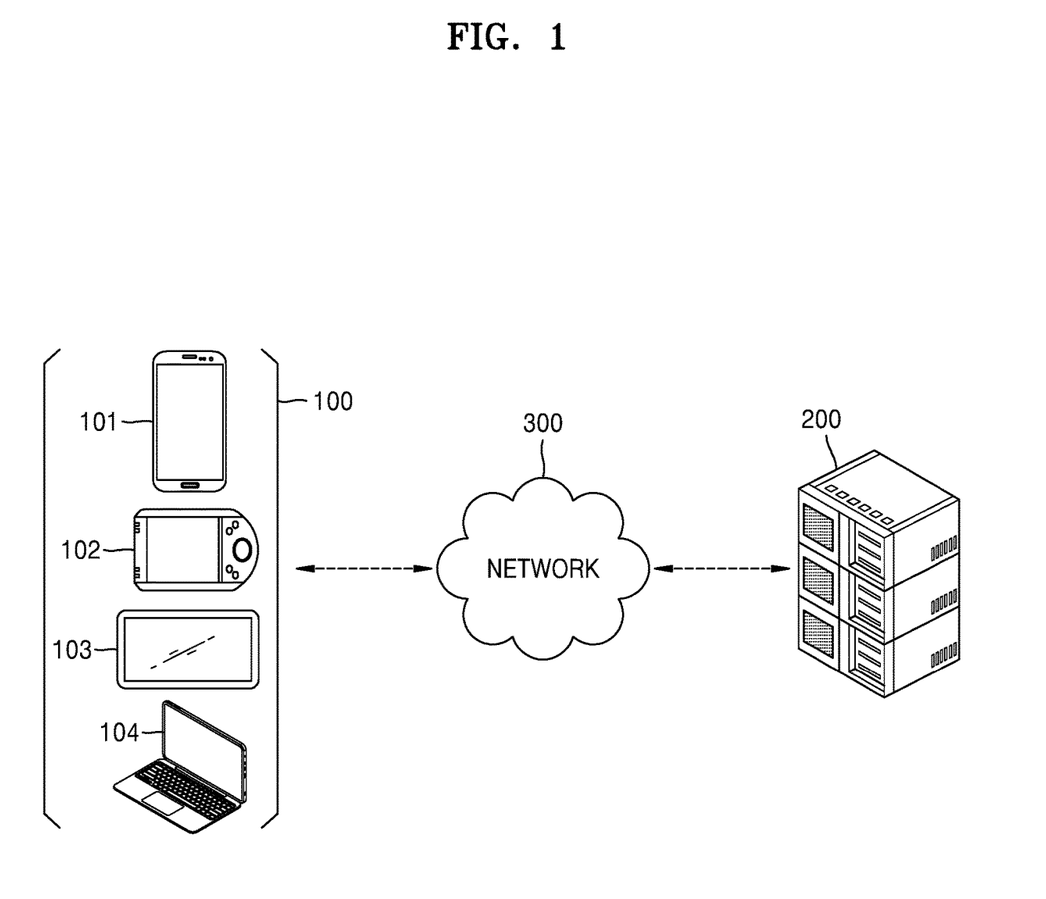
FIG. 1 is a diagram illustrating an example of a network environment according to an embodiment of the present disclosure.

FIG. 1 is a diagram illustrating an example of a network environment according to an embodiment of the present disclosure.

The network environment of FIG. 1 shows the example including a plurality of user terminals 101, 102, 103 and 104, a server 200 and a network 300. FIG. 1 is an example for describing the disclosure, and the number of user terminals or the number of servers is not limited as shown in FIG. 1.

The plurality of user terminals 101, 102, 103 and 104 may be fixed terminals implemented as computer devices or mobile terminals. Examples of the plurality of user terminals 101, 102, 103, and 104 include smart phones, mobile phones, navigation, computers, notebook computers, digital broadcasting terminals, personal digital assistants (PDAs), portable multimedia players (PMPs), tablet PCs, etc.

The plurality of user terminals 101, 102, 103, and 104 may communicate with each other and/or with the server 200 over the network 300 by using a wireless or wired communication method.

Meanwhile, the communication method of the plurality of user terminals 101, 102, 103, and 104 is not limited and may also include a communication method that utilizes a communication network (for example, a mobile communication network, wired Internet, wireless Internet, and a broadcasting network) that may include the network 300 as well as short range wireless communication between devices.

For example, the network 300 may include any one or more of networks among a personal area network (PAN), a local area network (LAN), a campus area network (CAN), a metropolitan area network (MAN), a wide area network (WAN), a broadband network (BBN), and the Internet.

In addition, the network 300 may include any one or more of network topologies, including bus networks, star networks, ring networks, mesh networks, star-bus networks, tree or hierarchical networks but is not limited thereto.

Hereinafter, for convenience of description, the plurality of user terminals 101, 102, 103, and 104 are referred to as and described a user terminal 100.

The server 200 may be implemented as a computer device or a plurality of computer devices that provide commands, codes, files, contents, services, etc. to the user terminal 100 through the network 300.

For example, the server 200 may provide a file for installing an application to the user terminal 100 accessed through the network 300. The user terminal 100 may install the application using a file provided from the server 200. In this case, the application may be an application for performing a three-dimensional (3D) modeling method of clothing.

In addition, the user terminal 100 may access the server 200 under the control of an operating system (OS) and at least one program (for example, a browser or an installed application) to receive services or contents provided by the server 200. For example, when the user terminal 100 requests pattern data through the network 300, the server 200 may transmit at least one pre-generated pattern data to the user terminal 100 in response to such a request. The user terminal 100 may display and provide the pattern data to a user according to the control of the application.

Figure 2:
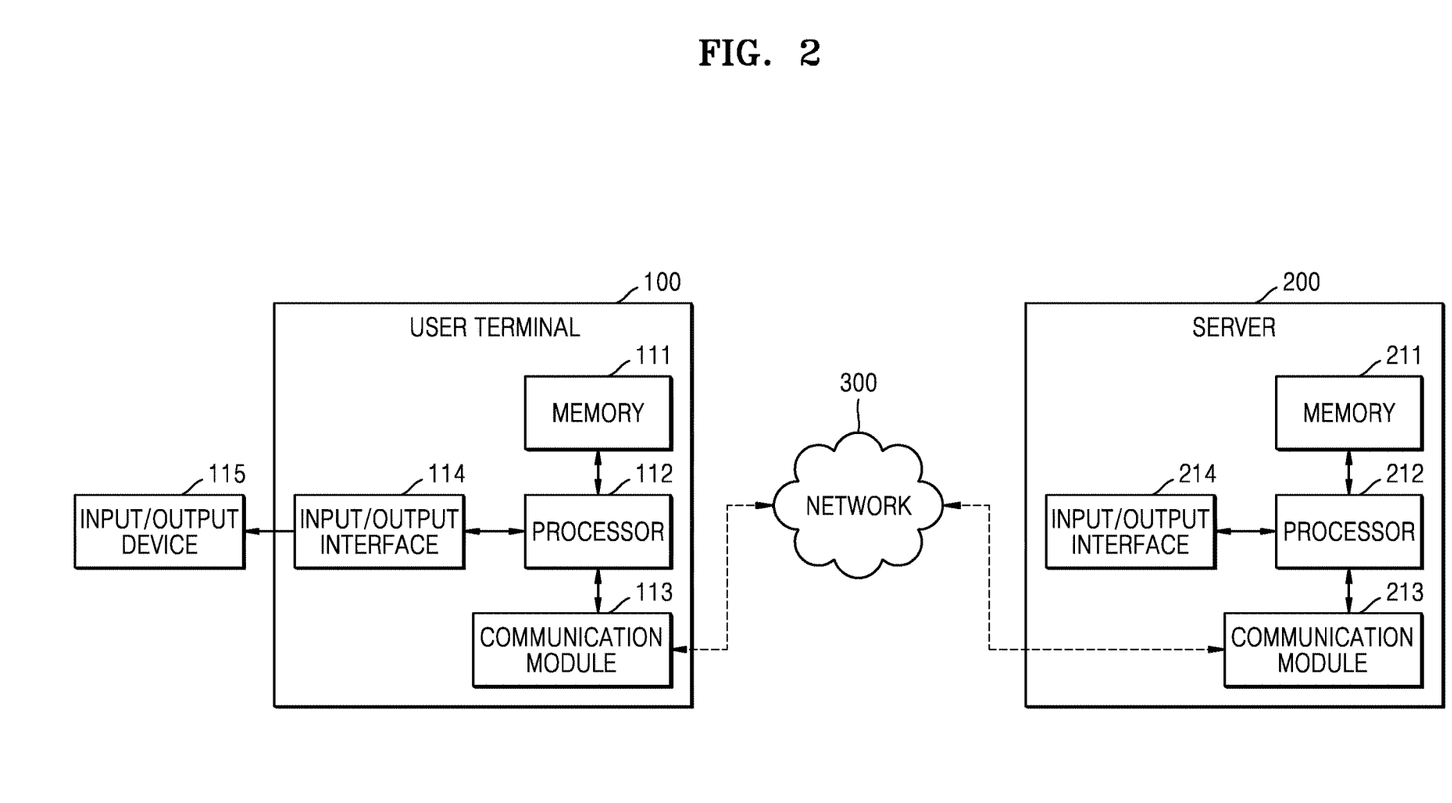
FIG. 2 is a block diagram for describing the internal configurations of a user terminal and a server according to an embodiment of the present disclosure.

FIG. 2 is a block diagram for describing the internal configurations of the user terminal 100 and the server 200 according to an embodiment of the present disclosure.

The user terminal 100 and the server 200 may respectively include memories 111 and 211, processors 112 and 212, communication modules 113 and 213, and input/output interfaces 114 and 214.

The memories 111 and 211 are computer-readable recording media, and may include permanent mass storage devices such as random access memory (RAM), read only memory (ROM), and a disk drive. In addition, the memory 111 and 211 may store an OS and at least one program code (for example, a code for 3D modeling of clothing installed and driven in the user terminal 100). These software components may be loaded from a computer-readable recording medium separate from the memories 111 and 211 using a drive mechanism. Such a separate computer-readable recording medium may include a computer-readable recording medium such as a floppy drive, a disk, a tape, a DVD/CD-ROM drive, a memory card, etc.

In another embodiment, the software components may be loaded into the memories 111 and 211 through the communication modules 113 and 213 rather than the computer-readable recording medium. For example, at least one program may be loaded into the memories 111 and 211 based on a program installed by files that are provided by developers or a file distribution system (for example, the server 200 described above) that distributes the installation file of the application through the network 300.

The processors 112 and 212 may be configured to process commands of a computer program by performing basic arithmetic, logic, and input/output operations. The commands may be provided to the processors 112 and 212 by the memories 111 and 211 or the communication modules 113 and 213. For example, the processors 112 and 212 may be configured to execute commands received according to a program code stored in a recording device such as the memories 111 and 211.

The communication modules 113 and 213 may provide functions for the user terminal 100 and the server 200 to communicate with each other through the network 300, and may provide functions to communicate with another user terminal (not shown) or another server (not shown). As an example, a request generated according to the program code that the processor 112 of the user terminal 100 stores in a recording device such as the memory 111 may be sent to the server 200 through the network 300 under the control of the communication module 113. To the contrary, control signals, commands, contents, files, etc. provided under the control of the processor 212 may be sent to the user terminal 100 via the communication module 213 and the network 300 through the communication module 113 of the user terminal 100.

The input/output interfaces 114 and 214 may be means for interfacing with an input/output device 115. In this regard, the input device may include a device such as a keyboard or mouse, and the output device may include a device such as a display for displaying 3D modeled clothing.

As another example, the input/output interfaces 114 and 214 may be means for interfacing with a device such as a touch screen in which functions for input and output are integrated into one.

In addition, in other embodiments, the user terminal 100 and the server 200 may include more components than those of FIG. 2. However, there is no need to clearly show most of components of the related art. For example, the user terminal 100 may be implemented to include at least some of the above-described input/output device 115 or may further include other components such as a transceiver, a global positioning system (GPS) module, a camera, various sensors, database, etc.

Hereinafter, an example in which a 3D modeling method of clothing is performed by the processor 112 of the user terminal 100 will be described.

The processor 112 according to an embodiment of the present disclosure may generate pattern data of clothing based on a user input.

In the present disclosure, 'pattern data' of clothing may mean a data set including various information for producing clothing. For example, the pattern data may include at least one of form, dimension information, stitch information, material information, and landmark information of at least one part constituting clothing as an attribute.

In the present disclosure, the 'part' constituting clothing may mean at least a part of clothing used for producing the corresponding clothing. For example, the part may refer to a piece of fabric cut for the production of the corresponding clothing, or may refer to a button, zipper, or other member for combining used in the production of the corresponding clothing. However, this is merely exemplary and the spirit of the present disclosure is not limited thereto.

In the present disclosure, 'stitch information' is information for combining the above-described parts, and may mean information about seams of cut pieces of fabric. In this case, the stitch information may include not only information about a material used when combining parts, but also information about a usage type when combining the corresponding material. For example, when the stitch information is information about seams of the cut pieces of fabric, the stitch information may include information about the number of sewing stitches and information about the color, thickness, and material of threads used for sewing. In addition, the stitch information may include information about physical properties of combining such as a combining method between parts, combining elasticity, and combining strength. However, this is merely exemplary and the spirit of the present disclosure is not limited thereto.

In the present disclosure, 'material information' may include visual information of a material and physical property information of the material. In this case, the visual information of the material may include a color of the material, a pattern of the material, etc. Meanwhile, the information about the physical property of the material may include thickness, density, resilience, elasticity, breathability, abrasion property, and transparency of the material. However, the above-described material information is exemplary, and may be included in the material information of the present disclosure as long as it is a property capable of representing the unique characteristics of the material.

The processor 112 according to an embodiment of the present disclosure may receive such material information from a manufacturer server (not shown) of the material, or may receive the material information from another user terminal (not shown) and store the material information in the memory 111.

The processor 112 according to an embodiment of the present disclosure may generate the aforementioned pattern data based on a user input.

In a selective embodiment, the processor 112 according to an embodiment of the present disclosure may obtain the above-described pattern data from an equipment that generates pattern data of clothing. In this case, the equipment that generates the pattern data of clothing may include, for example, a plurality of image sensors, at least one light source, and a distance sensor and generate the pattern data by scanning 3D information of clothing. However, the equipment that generates the pattern data as described above is exemplary, and the spirit of the present disclosure is not limited thereto.

Figure 3:
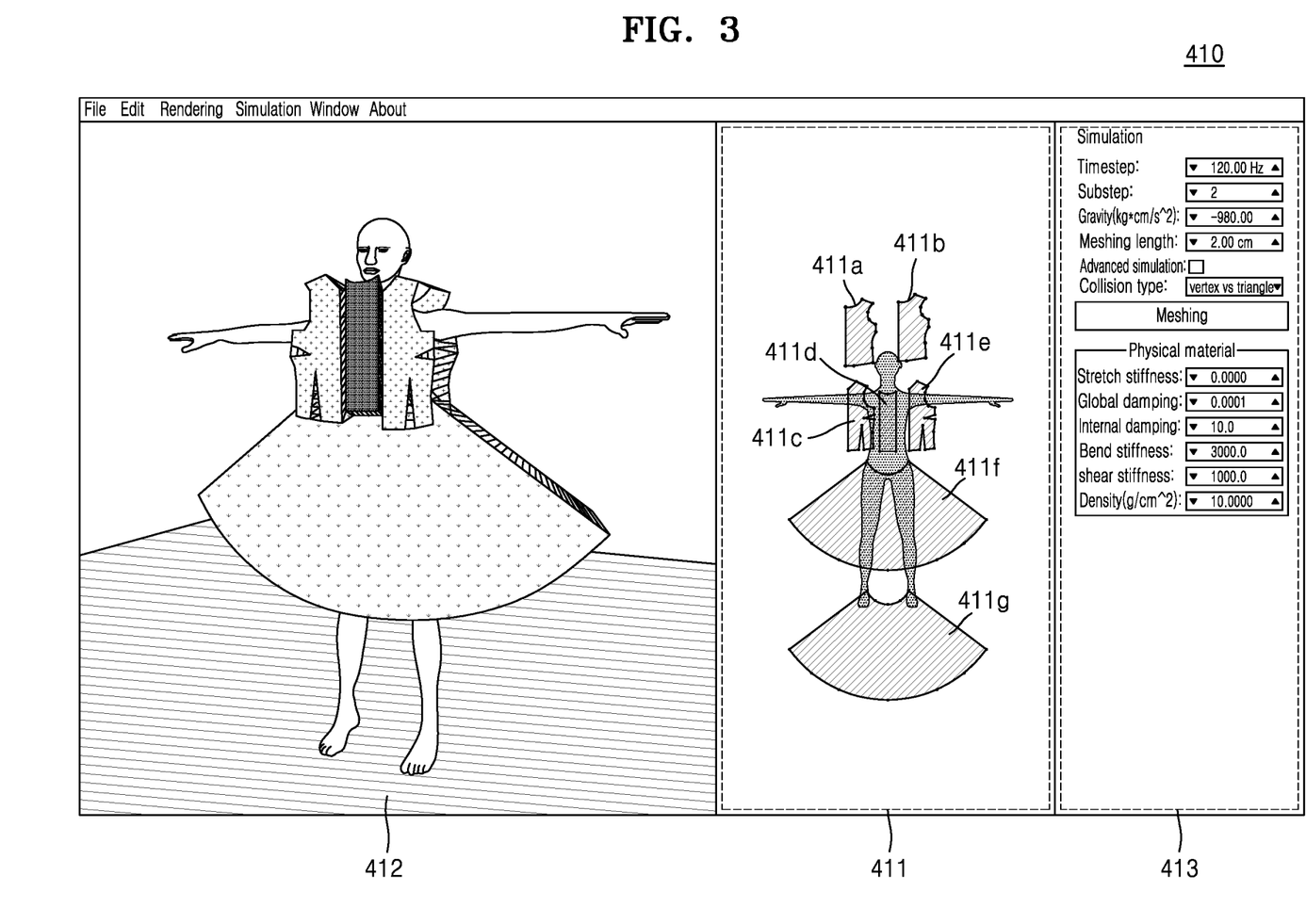
FIG. 3 is an example of a screen for generating pattern data.

FIG. 3 is an example of a screen 410 for generating pattern data.

Referring to FIG. 3, the screen 410 may include a region 411 for editing forms of parts 411a to 411g constituting clothing, a region 412 for displaying a shape of clothing in a 3D (3D) space, and a region 413 for setting various setting values or setting attributes of the parts 411a to 411g or stitch information between the parts 411a to 411g when displaying clothing.

The processor 112 according to an embodiment of the present disclosure may generate the pattern data with respect to the corresponding clothing based on a user input through an interface such as the screen 410. For example, in the region 411 for editing the form of the part, a user may generate the pattern data of clothing by modifying the forms of the parts 411a to 411g or adding a new part in a two-dimensional (2D) space. Furthermore, in addition to the form of the part, the processor 112 may generate and/or edit the pattern data of clothing based on user inputs corresponding to various items constituting the pattern data of clothing.

The processor 112 may store a series of inputs and/or manipulations of the user for generating the pattern data of specific clothing in the memory 111. The processor 112 may transmit such pattern data to the server 200 and/or another user terminal (not shown) through the communication module 113.

The processor 112 according to an embodiment of the present disclosure may load the pattern data of clothing generated through the above-described process. At this time, 'loading' the pattern data may mean retrieving the pattern data from the memory 111 and/or the server 200 to make the corresponding pattern data display, editable and/or modifiable. For example, when a plurality of pattern data are generated through the above-described process, the pattern data may be loaded by a user selection of any one of a plurality of pattern data stored in the memory 111. In addition, the pattern data may be loaded by the user downloading specific pattern data from the server 200. However, this is merely exemplary and the spirit of the present disclosure is not limited thereto.

The processor 112 according to an embodiment of the present disclosure may load body data for a body on which clothing corresponding to the pattern data is to be put, similarly to loading of the pattern data. In this case, the 'body data' may include information about at least one of the size of the body, the ratio of each part, race, gender, and skin color. Also, the processor 112 according to an embodiment of the present disclosure may modify at least one of the above-described items included in the body data based on a body data modification input of the user. For example, the processor 112 may modify information about the gender included in the body data from male to female based on a user input of modifying the gender from male to female.

The processor 112 according to an embodiment of the present disclosure may display a stereoscopic shape of the corresponding clothing based on the pattern data of clothing loaded by the above-described process. In this case, the stereoscopic shape may mean a form in the 3D space of clothing based on the pattern data.

Meanwhile, the processor 112 according to an embodiment of the present disclosure may display the stereoscopic shape of clothing in consideration of the pattern data and the separately loaded body data. In other words, the processor 112 according to an embodiment of the present disclosure may display the stereoscopic shape of clothing based on the body data and the pattern data.

Figure 4:
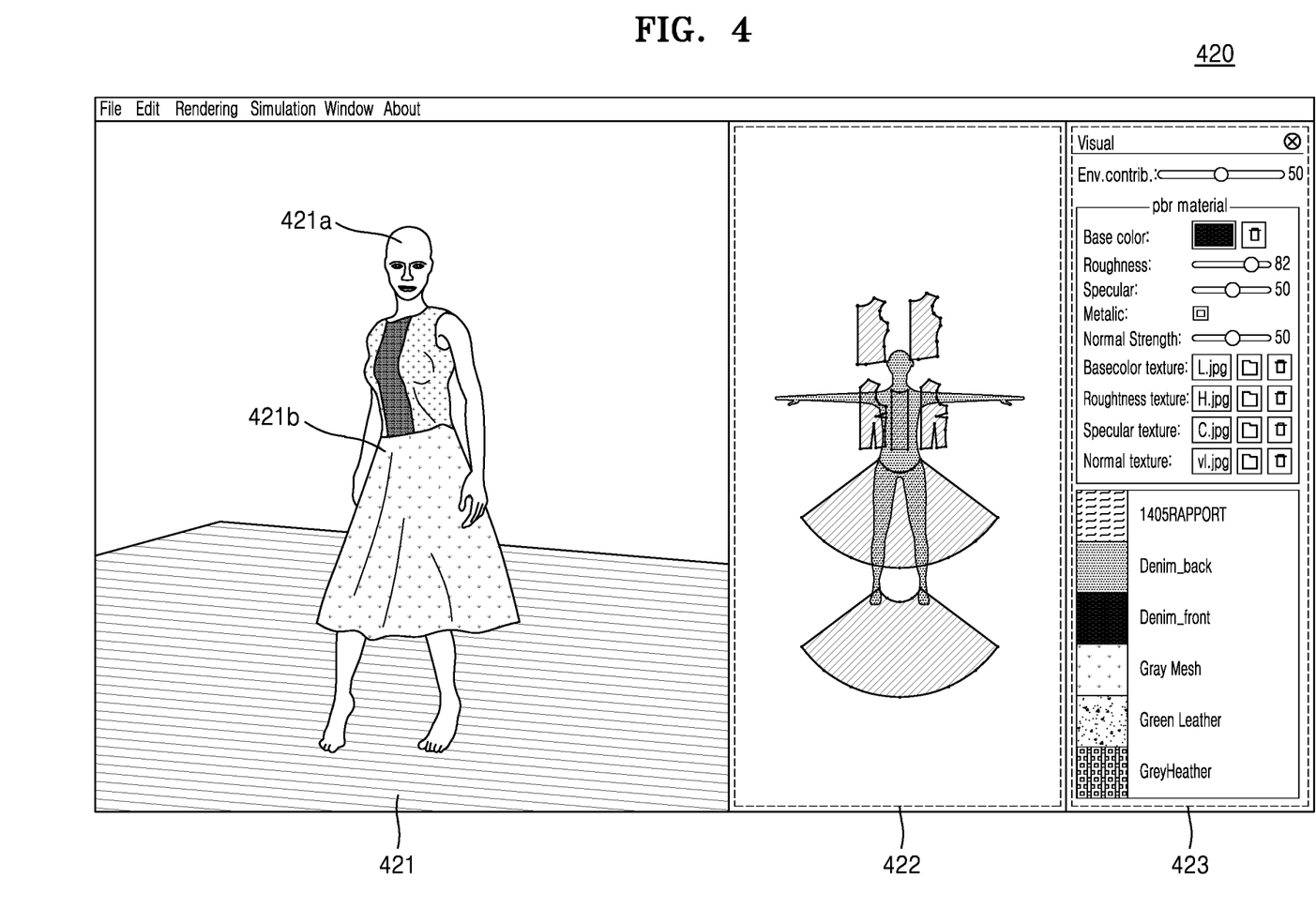
FIG. 4 is an example of a screen for displaying a stereoscopic shape of clothing.

FIG. 4 is an example of a screen 420 displaying a stereoscopic shape of clothing.

Similar to FIG. 3, the screen 420 may include a region 421 for displaying a shape in a 3D space of clothing, a region 422 for displaying or editing forms of parts constituting clothing, and a region 423 for setting various setting values when displaying clothing.

The processor 112 according to an embodiment of the present disclosure may display a 3D shape 421a of a body based on body data and a 3D shape 421b of clothing in consideration of the 3D shape 421a of the body on the region 421 for displaying the shape in the 3D space of clothing.

As described above, the processor 112 according to an embodiment of the present disclosure may consider the 3D shape 421a of the body when displaying the 3D shape 421b of clothing.

In addition, the processor 112 according to an embodiment of the present disclosure may consider a space that is a background of a clothing display when displaying the 3D shape 421b of clothing.

Meanwhile, the processor 112 according to an embodiment of the present disclosure may display one or more parts (or a 3D shape of the one or more parts) on the 3D shape 421a of the body before displaying the 3D shape 421b of clothing or according to a user input.

Hereinafter, with reference to FIGS. 5 to 9, descriptions that the processor 112 according to an embodiment of the present disclosure displays one or more parts on a region 421 displaying a shape in a 3D space of clothing.

Figure 5:
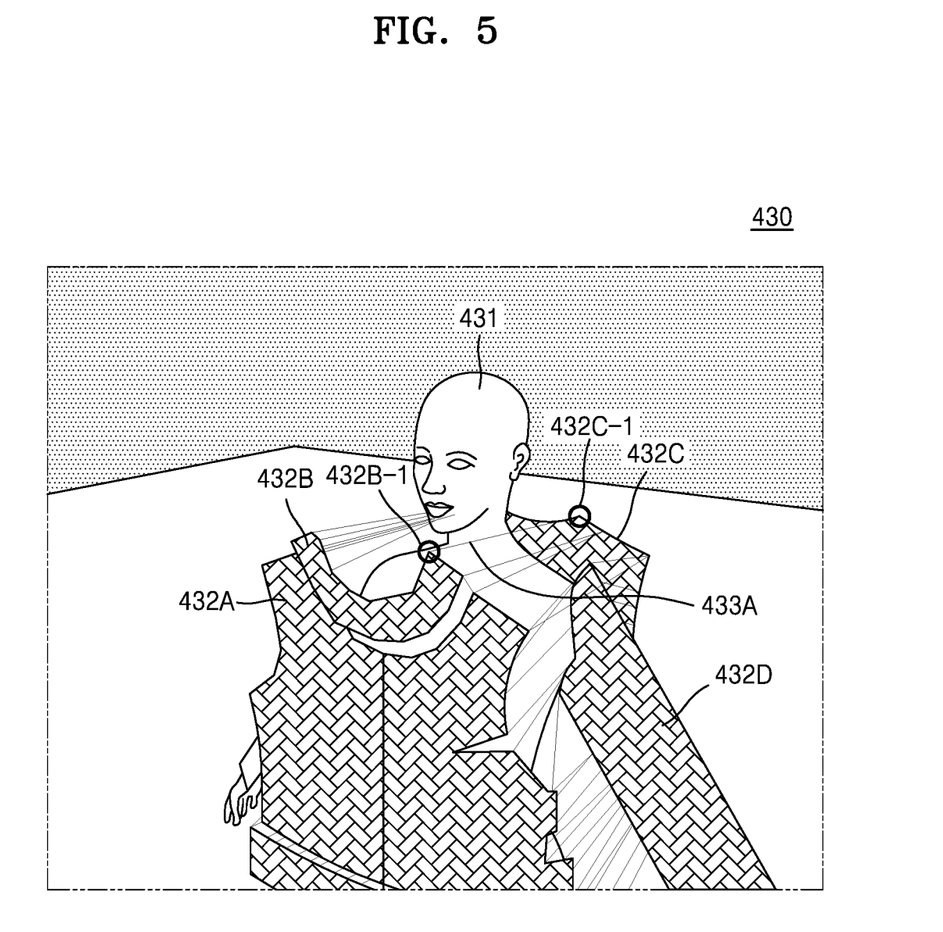
FIG. 5 is an example of a screen on which one or more parts are displayed on a three-dimensional (3D) shape of a body.

FIG. 5 is an example of a screen 430 on which one or more parts 432A, 432B, 432C, and 432D are displayed on a 3D shape 431 of a body.

The processor 112 according to an embodiment of the present disclosure may display 3D shapes of the one or more parts 432A, 432B, 432C, and 432D on the 3D shape 431 of the body, as shown in FIG. 5. In this case, the 3D shapes of the one or more parts 432A, 432B, 432C, and 432D may be generated by the processor 112 according to the above-described process or based on loaded pattern data. For example, the processor 112 may refer to two-dimensional (2D) information of the one or more parts 432A, 432B, 432C, and 432D included in the pattern data and material information (especially thickness information) of the one or more parts 432A, 432B, 432C, and 432D to generate and display each 3D shape.

The processor 112 according to an embodiment of the present disclosure may display the 3D shapes of the one or more parts 432A, 432B, 432C, and 432D on positions respectively corresponding to the one or more parts 432A, 432B, 432C, and 432D on the 3D shape 431 of the body. For example, the processor 112 may display the part 432A constituting a front side of clothing on a front side of the 3D shape 431 of the body and display the part 432D constituting a sleeve of clothing on an arm portion of the 3D shape 431 of the body.

In an embodiment of the present disclosure, pattern information may include a landmark which is information about a portion where each of the one or more parts 432A, 432B, 432C, and 432D contacts a human body (or the 3D shape 431 of the body). The processor 112 according to an embodiment of the present disclosure may determine display positions of the 3D shapes of the one or more parts 432A, 432B, 432C, and 432D by referring to the landmark.

The processor 112 according to an embodiment of the present disclosure may determine the display positions of the 3D shapes of the one or more parts 432A, 432B, 432C, and 432D by considering distances between the 3D shapes of the one or more parts 432A, 432B, 432C, and 432D and distances between the 3D shapes of the one or more parts 432A, 432B, 432C, and 432D and the 3D shape 431 of the body.

For example, the processor 112 according to an embodiment of the present disclosure may determine a first positon of a first part such that a distance between any one portion on a 3D shape of the first part and the 3D shape 431 of the body is equal to or greater than a predetermined first threshold distance.

In this case, the first part may mean any one of a plurality of parts constituting clothing, and the first position may mean a 3D position in a 3D space on which a stereoscopic shape of clothing is displayed.

In addition, the processor 112 according to an embodiment of the present disclosure may correct the first positon that is a positon of the first part such that a distance between any one portion on the 3D shape of the first part and any one portion on a 3D shape of a second part is equal to or greater than a predetermined second threshold distance. In this case, the first part and the second part may mean different parts as any one of a plurality of parts constituting clothing. In addition, any one portion on the 3D shape of the first part and any one portion on the 3D shape of the second part may mean arbitrary portions on the shape of each part.

The processor 112 according to an embodiment of the present disclosure may display the 3D shape of the first part on the first position corrected according to the above-described process.

Figure 6:
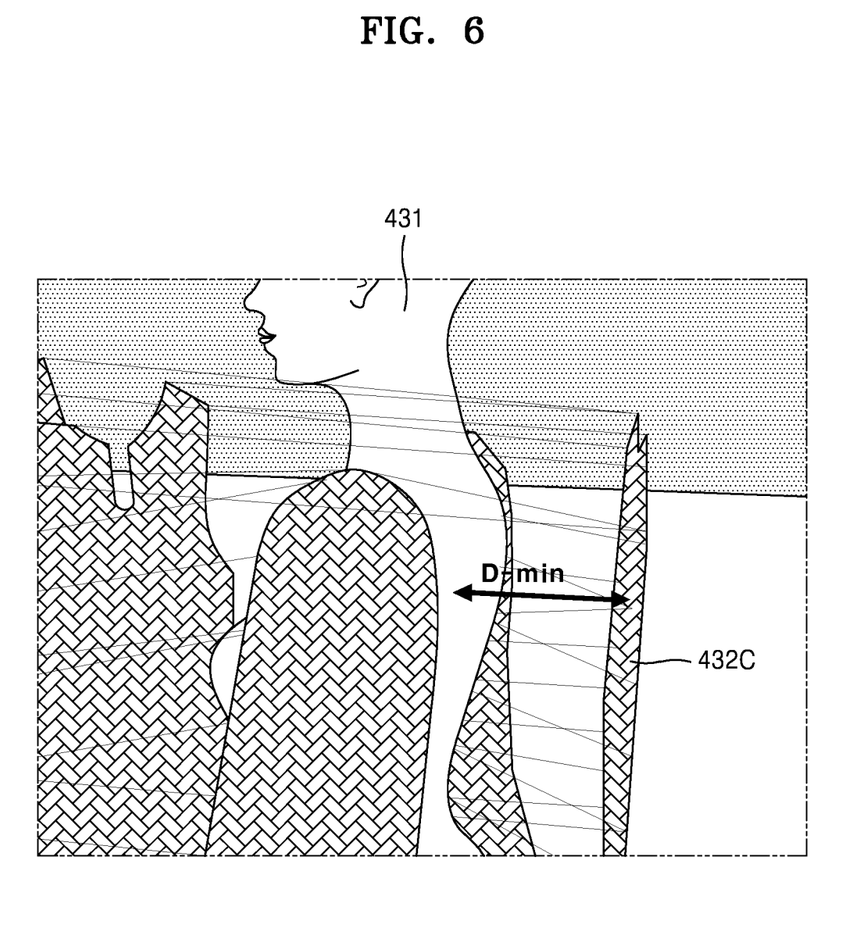
FIG. 6 is a diagram illustrating a process that a processor determines a display position of a part constituting a back side of clothing such that a distance between the 3D shape of the body and the part constituting the back side of clothing is equal to or greater than a predetermined first threshold distance according to an embodiment of the present disclosure.

FIG. 6 is a diagram illustrating a process that the processor 112 determines a display position of a part 432C constituting a back side of clothing such that a distance between the 3D shape 431 of the body and the part 432C constituting the back side of clothing is equal to or greater than a predetermined first threshold distance D_min according to an embodiment of the present disclosure.

For example, the processor 112 may move the display position of the part 432C constituting the back side of clothing in a direction away from the 3D shape 431 of the body such that the distance between the 3D shape 431 of the body and the part 432C constituting the back side of clothing is equal to or greater than the predetermined first threshold distance D_min. However, this is merely exemplary and the spirit of the present disclosure is not limited thereto.

The processor 112 according to an embodiment of the present disclosure may display a combining relationship between the one or more parts 432A, 432B, 432C, and 432D based on the loaded pattern data.

For example, the processor 112 may display the combining relationship between the part 432A constituting a front side of clothing, the part 432B constituting a collar of clothing, and the parts 432C constituting the back side of clothing as shown in FIG. 5.

The processor 112 according to an exemplary embodiment of the present disclosure may display portions combined with each other in each part in correspondence with each other. For example, when one or more parts include a first part and a second part that is combined with the first part, the processor 112 may display a first portion of the first part and a second portion that is combined with the first portion of the first part in correspondence with each other.

For example, the processor 112 may display a first portion 432B-1 of the part 432B constituting a collar of clothing and a second portion 432C-1 of the part 432C constituting a back side of clothing combined with the first portion 432B-1 in correspondence with each other.

Meanwhile, in the present disclosure, 'displaying the first portion 432B-1 and the second portion 432C-1 in correspondence with each other' may mean displaying a 3D shape of thread according to sewing connecting the first portion 432B-1 and the second portion 432C-1 on a 3D space. For example, the processor 112 may display a 3D shape 433A of thread connecting the first portion 432B-1 and the second portion 432C-1 to display the first portion 432B-1 and the second portion 432C-1 in correspondence with each other.

Figure 7:
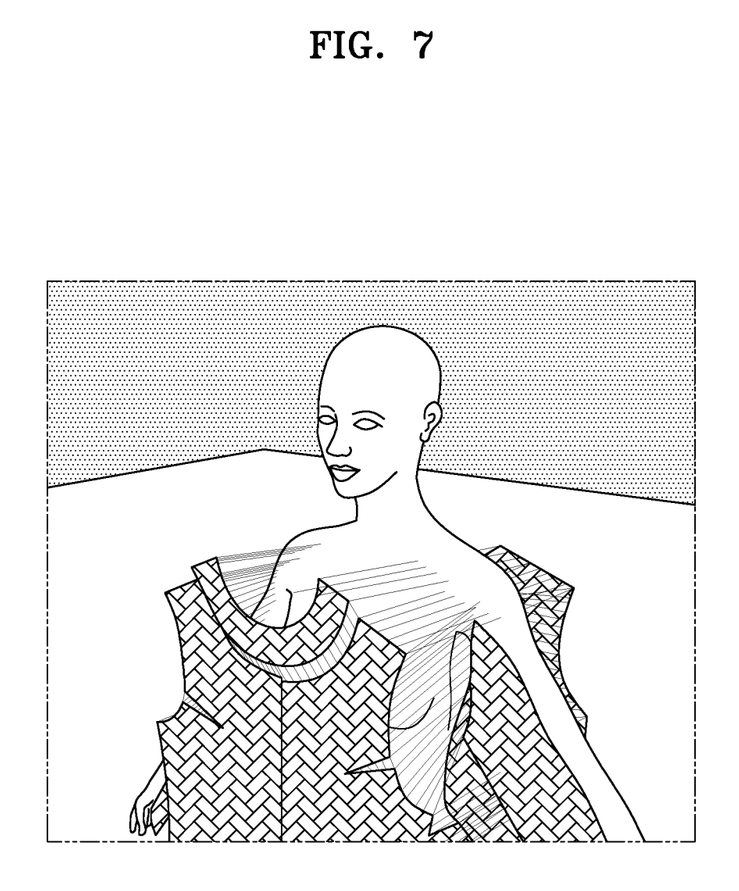
FIG. 7 is a diagram illustrating a case where a 3D shape of thread penetrates a 3D shape of a body

The processor 112 according to an embodiment of the present disclosure may not overlap the 3D shape 433A of thread with the 3D shape 431 of the body and 3D shapes of the one or more parts 432A, 432B, 432C, and 432D when displaying the 3D shape 433A of thread. For example, the processor 112 may prevent a case where a 3D shape of thread penetrates a 3D shape of the body as shown in FIG. 7.

To this end, the processor 112 according to an embodiment of the present disclosure may determine the 3D shape 433A of thread by referring to at least one of the 3D shape 431 of the body and the 3D shapes of the one or more parts 432A, 432B, 432C, and 432D.

Figure 8:
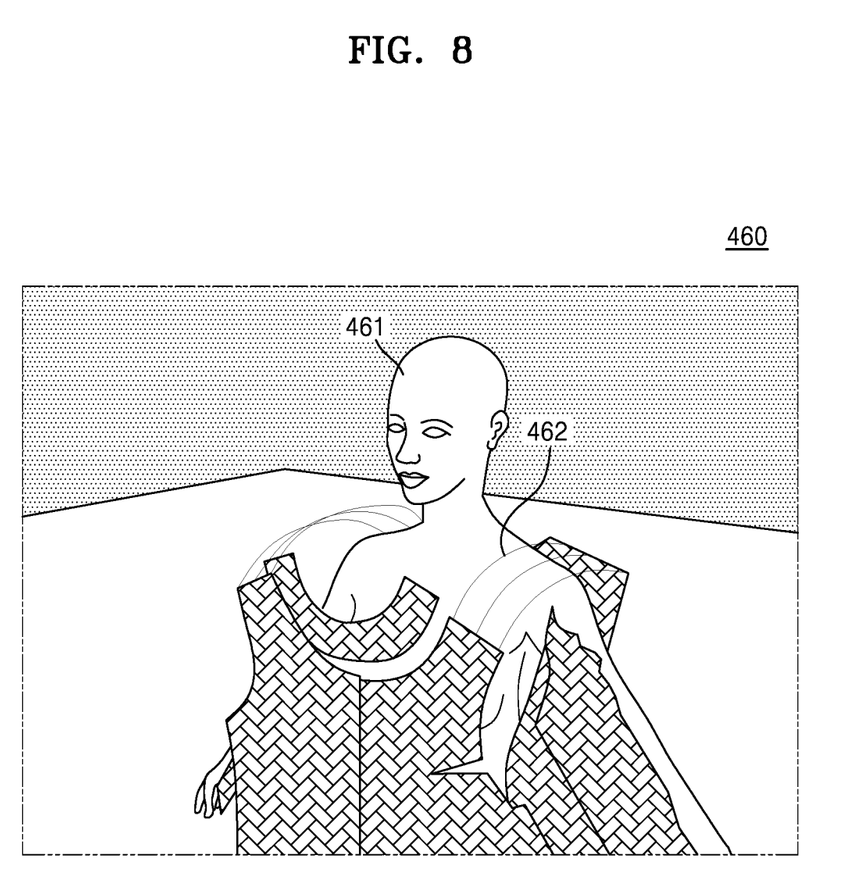
FIG. 8 is an example of a screen displaying a 3D shape of thread whose shape is determined so as not to overlap with a 3D shape of a body.

FIG. 8 is an example of a screen 460 displaying a 3D shape 462 of thread whose shape is determined so as not to overlap with the 3D shape 461 of a body.

As shown in FIG. 8, the processor 112 according to an embodiment of the present disclosure may determine the 3D shape 462 of thread according to the 3D shape 461 of the body.

Accordingly, the present disclosure may provide a more accurate prediction of sewing clothing. In particular, the present disclosure may prevent a failure of modeling of clothing or a failure of proper 3D modeling of clothing due to overlapping of a 3D shape of a part with a 3D shape of a body during a 3D modeling process of clothing.

In a selective embodiment, the processor 112 may obtain a user input to move a first part to a second position on a 3D space, and accordingly display the first part on the second position. Also, the processor 112 may update and display the 3D shape 462 of thread such that a first portion of the first part moved to the second position and a second part are connected to each other. Even at this time, the processor 112 may update and display the 3D shape 462 of thread such that the 3D shape 462 of thread does not overlap with the 3D shape 461 of the body and 3D shapes of one or more parts.

For example, the processor 112 may obtain a user input to move the part 432B constituting the collar to another position, and accordingly, may display the part 432B constituting the collar on a position according to the user input. At this time, the processor 112 may update and display the 3D shape 462 of thread that connects the first portion 432B-1 of the part 432B constituting the collar of clothing and having the changed position and the second portion 432C-1 of the part 432C constituting the back side of clothing combined with the first portion 432B-1. However, this is merely exemplary and the spirit of the present disclosure is not limited thereto.

Figure 9:
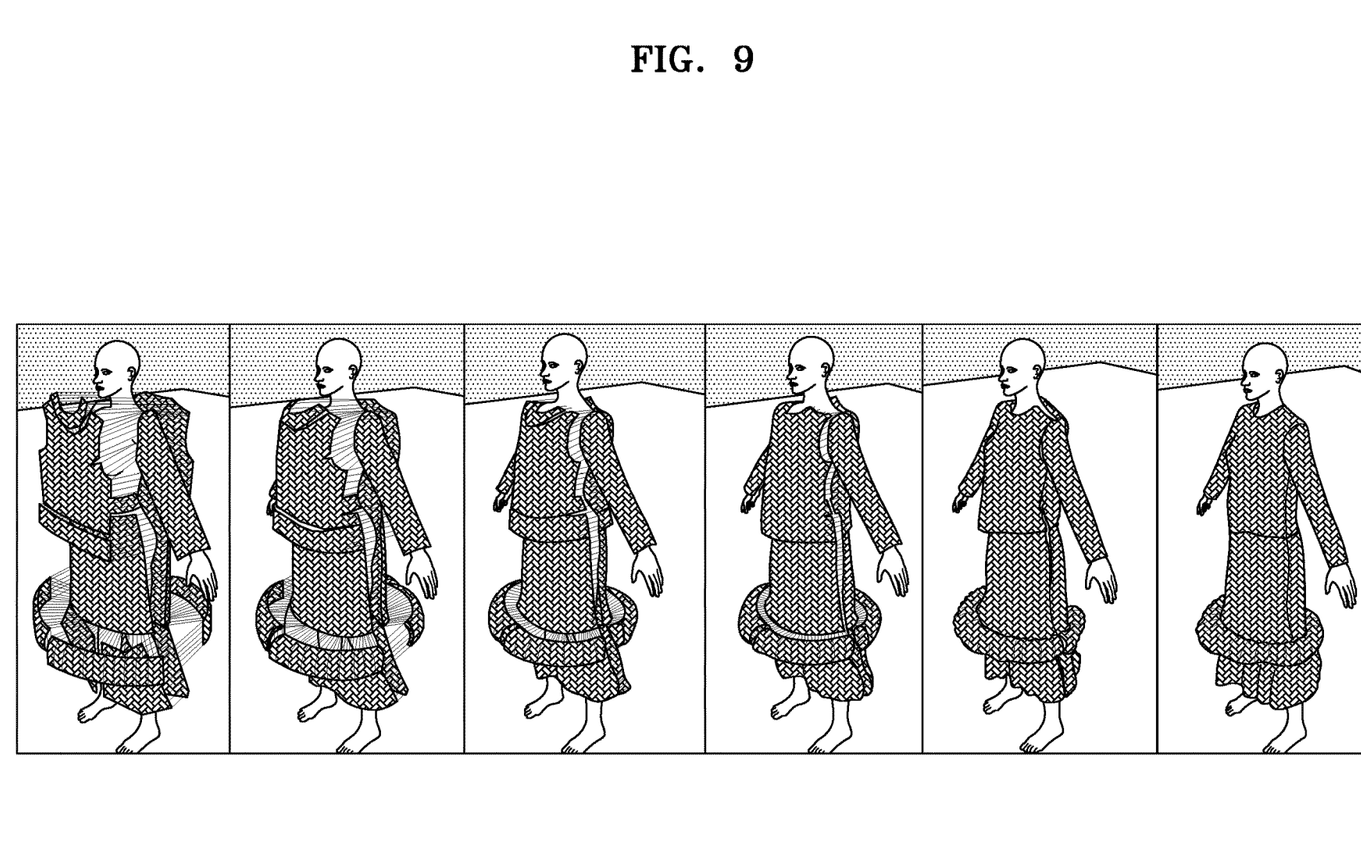
FIG. 9 is a diagram illustrating a process of combining one or more parts on a 3D shape of a body and putting clothing on the 3D shape of the body.

After displaying the one or more parts on the 3D shape of the body, the processor 112 according to an embodiment of the present disclosure may display a process of combining the one or more parts on the 3D shape of the body and putting clothing on the 3D shape of the body as shown in FIG. 9.

Accordingly, the present disclosure may previously examine a problem that may occur during an assembling process of clothing through modeling of clothing.

Figure 10:
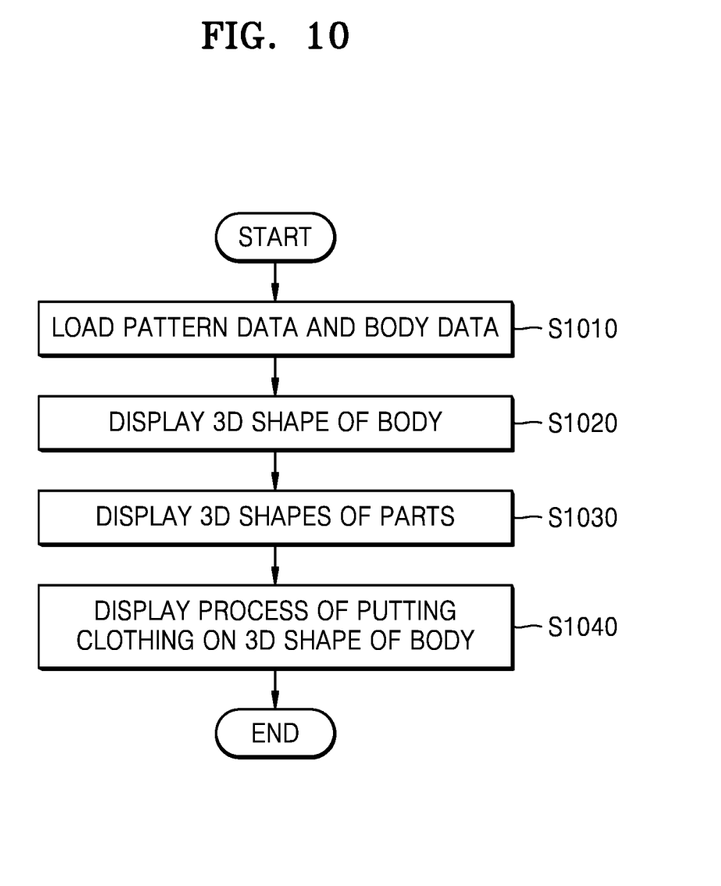
FIG. 10 is a flowchart illustrating a 3D modeling method of clothing performed by a user terminal according to an embodiment of the present disclosure.

FIG. 10 is a flowchart illustrating a 3D modeling method of clothing performed by the user terminal 100 according to an embodiment of the present disclosure. Hereinafter, descriptions of FIG. 10 redundant with those in FIGS. 1 to 9 will be omitted, and FIG. 10 will be described with reference to FIGS. 1 to 9 together.

The user terminal 100 according to an embodiment of the present disclosure may load pattern data of clothing to be modeled and body data.(S1010)

At this time, 'loading' the pattern data may mean retrieving the pattern data from the memory 111 and/or the server 200 to make the corresponding pattern data display, editable and/or modifiable. For example, when a plurality of pattern data are previously generated, the pattern data may be loaded by a user selection of any one of a plurality of pattern data stored in the memory 111. In addition, the pattern data may be loaded by the user downloading specific pattern data from the server 200. However, this is merely exemplary and the spirit of the present disclosure is not limited thereto.

The user terminal 100 according to an embodiment of the present disclosure may load body data for a body on which clothing corresponding to the pattern data is to be put, similarly to loading of the pattern data. In this case, the 'body data' may include information about at least one of the size of the body, the ratio of each part, race, gender, and skin color. Also, the user terminal 100 according to an embodiment of the present disclosure may modify at least one of the above-described items included in the body data based on a body data modification input of the user. For example, the user terminal 100 may modify information about the gender included in the body data from male to female based on a user input of modifying the gender from male to female.

The user terminal 100 according to an embodiment of the present disclosure may display a 3D shape of the body based on the loaded body data.(S1020) The user terminal 100 may display the 3D shape 421a of the body based on the body data on the region 421 displaying a shape of clothing on a 3D space shown in FIG. 4.

The user terminal 100 according to an embodiment of the present disclosure may display one or more parts (or 3D shapes of the one or more parts) on the 3D shape 421a of the body. (S1030)

Hereinafter, the description that the user terminal 100 according to an embodiment of the present disclosure may display one or more parts on the region 421 displaying the shape of clothing on the 3D space will be described with reference to FIGS. 5 to 9.

FIG. 5 is an example of the screen 430 on which the one or more parts 432A, 432B, 432C, and 432D are displayed on the 3D shape 431 of a body.

The user terminal 100 according to an embodiment of the present disclosure may display 3D shapes of the one or more parts 432A, 432B, 432C, and 432D on the 3D shape 431 of the body, as shown in FIG. 5. In this case, the 3D shapes of the one or more parts 432A, 432B, 432C, and 432D may be generated by the user terminal 100 according to the above-described process or based on loaded pattern data. For example, the user terminal 100 may refer to 2D information of the one or more parts 432A, 432B, 432C, and 432D included in the pattern data and material information (especially thickness information) of the one or more parts 432A, 432B, 432C, and 432D to generate and display each 3D shape.

The user terminal 100 according to an embodiment of the present disclosure may display the 3D shapes of the one or more parts 432A, 432B, 432C, and 432D on positions respectively corresponding to the one or more parts 432A, 432B, 432C, and 432D on the 3D shape 431 of the body. For example, the user terminal 100 may display the part 432A constituting a front side of clothing on a front side of the 3D shape 431 of the body and display the part 432D constituting a sleeve of clothing on an arm portion of the 3D shape 431 of the body.

In an embodiment of the present disclosure, pattern information may include a landmark which is information about a portion where each of the one or more parts 432A, 432B, 432C, and 432D contacts a human body (or the 3D shape 431 of the body). The user terminal 100 according to an embodiment of the present disclosure may determine display positions of the 3D shapes of the one or more parts 432A, 432B, 432C, and 432D by referring to the landmark.

The user terminal 100 according to an embodiment of the present disclosure may determine the display positions of the 3D shapes of the one or more parts 432A, 432B, 432C, and 432D by considering distances between the 3D shapes of the one or more parts 432A, 432B, 432C, and 432D and distances between the 3D shapes of the one or more parts 432A, 432B, 432C, and 432D and the 3D shape 431 of the body.

For example, the user terminal 100 according to an embodiment of the present disclosure may determine a first positon of a first part such that a distance between any one portion on a 3D shape of the first part and the 3D shape 431 of the body is equal to or greater than a predetermined first threshold distance.

In this case, the first part may mean any one of a plurality of parts constituting clothing, and the first position may mean a 3D position in a 3D space on which a stereoscopic shape of clothing is displayed.

In addition, the user terminal 100 according to an embodiment of the present disclosure may correct the first positon that is a positon of the first part such that a distance between any one portion on the 3D shape of the first part and any one portion on a 3D shape of a second part is equal to or greater than a predetermined second threshold distance. In this case, the first part and the second part may mean different parts as any one of a plurality of parts constituting clothing. In addition, any one portion on the 3D shape of the first part and any one portion on the 3D shape of the second part may mean arbitrary portions on the shape of each part.

The user terminal 100 according to an embodiment of the present disclosure may display the 3D shape of the first part on the first position corrected according to the above-described process.

FIG. 6 is a diagram illustrating a process that the user terminal 100 determines a display position of the part 432C constituting a back side of clothing such that a distance between the 3D shape 431 of the body and the part 432C constituting the back side of clothing is equal to or greater than the predetermined first threshold distance D_min according to an embodiment of the present disclosure.

For example, the user terminal 100 may move the display position of the part 432C constituting the back side of clothing in a direction away from the 3D shape 431 of the body such that the distance between the 3D shape 431 of the body and the part 432C constituting the back side of clothing is equal to or greater than the predetermined first threshold distance D_min. However, this is merely exemplary and the spirit of the present disclosure is not limited thereto.

The user terminal 100 according to an embodiment of the present disclosure may display a combining relationship between the one or more parts 432A, 432B, 432C, and 432D based on the loaded pattern data.

For example, the user terminal 100 may display the combining relationship between the part 432A constituting a front side of clothing, the part 432B constituting a collar of clothing, and the parts 432C constituting the back side of clothing as shown in FIG. 5.

The user terminal 100 according to an exemplary embodiment of the present disclosure may display portions combined with each other in each part in correspondence with each other. For example, when one or more parts include a first part and a second part that is combined with the first part, the user terminal 100 may display a first portion of the first part and a second portion that is combined with the first portion of the first part in correspondence with each other.

For example, the user terminal 100 may display the first portion 432B-1 of the part 432B constituting a collar of clothing and the second portion 432C-1 of the part 432C constituting a back side of clothing combined with the first portion 432B-1 in correspondence with each other.

Meanwhile, in the present disclosure, 'displaying the first portion 432B-1 and the second portion 432C-1 in correspondence with each other' may mean displaying a 3D shape of thread according to sewing connecting the first portion 432B-1 and the second portion 432C-1 on a 3D space. For example, the user terminal 100 may display the 3D shape 433A of thread connecting the first portion 432B-1 and the second portion 432C-1 to display the first portion 432B-1 and the second portion 432C-1 in correspondence with each other.

The user terminal 100 according to an embodiment of the present disclosure may not overlap the 3D shape 433A of thread with the 3D shape 431 of the body and 3D shapes of the one or more parts 432A, 432B, 432C, and 432D when displaying the 3D shape 433A of thread. For example, the user terminal 100 may prevent a case where a 3D shape of thread penetrates a 3D shape of the body as shown in FIG. 7.

To this end, the user terminal 100 according to an embodiment of the present disclosure may determine the 3D shape 433A of thread by referring to at least one of the 3D shape 431 of the body and the 3D shapes of the one or more parts 432A, 432B, 432C, and 432D.

FIG. 8 is an example of the screen 460 displaying the 3D shape 462 of thread whose shape is determined so as not to overlap with the 3D shape 461 of a body.

As shown in FIG. 8, the user terminal 100 according to an embodiment of the present disclosure may determine the 3D shape 462 of thread according to the 3D shape 461 of the body.

Accordingly, the present disclosure may provide a more accurate prediction of sewing clothing. In particular, the present disclosure may prevent a failure of modeling of clothing or a failure of proper 3D modeling of clothing due to overlapping of a 3D shape of a part with a 3D shape of a body during a 3D modeling process of clothing.

In a selective embodiment, the user terminal 100 may obtain a user input to move a first part to a second position on a 3D space, and accordingly display the first part on the second position. Also, the user terminal 100 may update and display the 3D shape 462 of thread such that a first portion of the first part moved to the second position and a second part are connected to each other. Even at this time, the user terminal 100 may update and display the 3D shape 462 of thread such that the 3D shape 462 of thread does not overlap with the 3D shape 461 of the body and 3D shapes of one or more parts.

For example, the user terminal 100 may obtain a user input to move the part 432B constituting the collar to another position, and accordingly, may display the part 432B constituting the collar on a position according to the user input. At this time, the user terminal 100 may update and display the 3D shape 462 of thread that connects the first portion 432B-1 of the part 432B constituting the collar of clothing and having the changed position and the second portion 432C-1 of the part 432C constituting the back side of clothing combined with the first portion 432B-1. However, this is merely exemplary and the spirit of the present disclosure is not limited thereto.

After displaying the one or more parts on the 3D shape of the body, the user terminal 100 according to an embodiment of the present disclosure may display a process of combining the one or more parts on the 3D shape of the body and putting clothing on the 3D shape of the body.(S1040) Referring to FIG. 9, the user terminal 100 according to an embodiment of the present disclosure may display a process of assembling one or more parts over time.

Accordingly, the present disclosure may previously examine a problem that may occur during an assembling process of clothing through modeling of clothing.

The device described above may be realized as hardware elements, software elements, and/or the combination of hardware elements and software elements. For example, the device and the components described in the embodiments may be realized by using, for example, a processor, an arithmetic logic unit (ALU), a digital signal processor, a microcomputer, a field programmable gate array (FPGA), a programmable logic unit (PLU), a microprocessor, or one or more general-purpose computers or special-purpose computers, such as a device capable of executing and responding to instructions. A processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, to independently or collectively instruct or configure the processing device to operate as desired. Software and/or data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums.

The methods according to the above-described embodiments may be recorded in non-transitory computer-readable media including program instructions to implement various operations embodied by a computer. The non-transitory computer-readable media may also include, alone or in combination with the program instructions, data files, data structures, and the like. The program instructions recorded on the media may be those specially designed and constructed for the purposes of the embodiments, or they may be of the kind well-known and available to those having skill in the computer software arts. Examples of non-transitory computer-readable media include magnetic media such as hard disks, floppy disks, and magnetic tape; optical media such as CD ROM disks and DVDs; magneto-optical media such as optical discs; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments, or vice versa.

As described above, although the embodiments have been described by the limited embodiment and drawings, it will be apparent to one of ordinary skill in the art that various changes in form and details may be made in these examples without departing from the spirit and scope of the claims and their equivalents. For example, suitable results may be achieved if the described techniques are performed in a different order, and/or if components in a described system, architecture, device, or circuit are combined in a different manner and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

The invention claimed is:

1. A three-dimensional (3D) modeling method of clothing to arrange and display parts constituting clothing in a 3D space, the 3D modeling method comprising:
    loading pattern data and body data, wherein the pattern data comprises information about one or more parts constituting the clothing, and the body data comprises a 3D shape of a body on which the clothing is to be put;
    displaying the 3D shape of the body based on the body data; and
    displaying the one or more parts on the 3D shape of the body based on the pattern data,
        wherein the displaying of the one or more parts comprises:
        displaying a 3D shape of the one or more parts at a position corresponding to each of the one or more parts on the 3D shape of the body; and
        displaying a combining relationship between the one or more parts displayed on the 3D shape of the body based on the pattern data,
        wherein the one or more parts comprise a first part and a second part combined with the first part,
        wherein the displaying of the combining relationship between the one or more parts comprises:
        displaying a first portion of the first part and a second portion of the second part that is combined with the first portion to be in correspondence with each other,
        wherein the displaying of the first portion of the first part and the second portion of the second part that is combined with the first portion to be in correspondence with each other comprises:
        displaying, in the 3D space, a 3D shape of a thread according to sewing connecting the first portion to the second portion,
        wherein the displaying of the 3D shape of the thread comprises:
        determining the 3D shape of the thread by referring to at least one of the 3D shape of the body and the 3D shapes of the one or more parts such that the 3D shape of the thread does not overlap with the 3D shape of the body and the 3D shapes of the one or more parts,
        wherein the displaying of the first portion of the first part and the second portion of the second part that is combined with the first portion to be in correspondence with each other comprises:
        obtaining a user input to move the first part to a second position in the 3D space;
        displaying the first part at the second position according to the user input; and
        updating and displaying the 3D shape of the thread such that a first portion of the first part moved to the second position and the second part are connected to each other.

* * * * *